United States Patent [19]

Giants

[11] Patent Number: 4,497,951
[45] Date of Patent: Feb. 5, 1985

[54] ETHYNYL-PHENYLENE-SUBSTITUTED-1,3,5-TRIAZINE DERIVATIVES AND PROCESS FOR THEIR PRODUCTION

[75] Inventor: Thomas W. Giants, Santa Monica, Calif.

[73] Assignee: Hughes Aircraft Company, El Segundo, Calif.

[21] Appl. No.: 487,336

[22] Filed: Apr. 21, 1983

Related U.S. Application Data

[62] Division of Ser. No. 326,792, Dec. 3, 1981, Pat. No. 4,442,278.

[51] Int. Cl.³ .................. C07D 253/04; C07D 403/10; C07D 403/12; C07D 403/14
[52] U.S. Cl. .................................... 544/206; 544/207; 544/208; 544/209; 544/210; 544/211; 544/212; 544/216; 544/219; 526/261

[58] Field of Search ............... 544/180, 206, 207, 208, 544/209, 210, 211, 212, 216, 219; 526/261

[56] References Cited

U.S. PATENT DOCUMENTS 1,911,689  5/1933  Hentrich et al. .................... 544/180
3,415,824 12/1968  Biland et al. ...................... 544/206

Primary Examiner—Henry R. Jiles
Assistant Examiner—J. G. Mullins
Attorney, Agent, or Firm—A. W. Karambelas

[57] ABSTRACT

Acetylene terminated s-triazine oligomers are disclosed which polymerize into stable high temperature resins. The oligomers of this invention are readily prepared from off-the-shelf starting materials, they are soluble in conventional low boiling solvents and exhibit low melting points which facilitate ease of processing.

9 Claims, No Drawings

ETHYNYL-PHENYLENE-SUBSTITUTED-1,3,5-TRIAZINE DERIVATIVES AND PROCESS FOR THEIR PRODUCTION

This is a division of application Ser. No. 326,792, filed Dec. 3, 1981, U.S. Pat. No. 4,442,278.

TECHNICAL FIELD

This invention relates, generally, to the provision of triazine derivatives and more particularly to the provision of symmetrical triazine derivatives having acetylene terminal groups which are polymerizable.

BACKGROUND OF THE INVENTION

1. Field of the Invention

Thermally and oxidatively stable resins are finding increasingly widespread utility in the fabrication of composites for military and non-military applications. Polymers containing triazine ring systems and triazine groups offer a promise of increased thermal stability and good mechanical characteristics. However, these polymers have been limited in their usefulness from a practical point of view because of processing and curing difficulties. This invention overcomes most, if not all, of the disadvantages associated with the use of polymers containing triazine ring systems to form curable resins.

2. Description of the Prior Art

The triazine ring system is well known in the field of organic chemistry. Triazine compounds have been used for herbicides and numerous other applications. Both symmetrical triazine (s-triazine) and asymmetrical triazine (as-triazine) polymers have been prepared. However, unlike the approach described for the present invention, these materials do not have a preformed triazine ring system. The ring system of these prior art polymers are formed during the polymerization reaction. Thus, in both cases the method of preparation and the consequent processing characteristics are much more complex than that of this invention. Further, asymmetrical triazine polymers prepared via prior art methods are not thermosetting and therefore are not useful in the fabrication of thermoset composites; see, e.g., "Acetylene Terminated Phenyl-As-Triazine Oligomers and Polymers Therefrom" by P. M. Hergenrother, *Organic Coatings and Plastic Chemistry*, Vol. 38, page 576 (March 1978).

Thus, there is still a need for polymerizable s-triazine oligomers which exhibit good processing characteristics, and which are flexible and curable into thermoset polymers or resins.

SUMMARY OF THE INVENTION

Heat stable polymers exhibiting few, if any, of the disadvantages of prior art polymers have been prepared from novel ethynyl-substituted aromatic compounds having at least one central symmetrical triazine nucleus within the molecular backbone structure.

The polymers of this invention are prepared from oligomers having at least two ethynylphenyl terminal groups linked to at least one symmetrical triazine ring. The terminal group-triazine ring linkage may be a single bond, a divalent heteroatom or it may be a divalent hydrocarbon moiety. In those instances where the oligomer is formed from more than one triazine ring, the triazine rings are linked together by a divalent aromatic moiety such as biphenylene, phenyleneoxyphenylene, phenylene(perfluoroisopropylidene)phenylene, phenylenethiophenylene, phenylenesulfonylphenylene, or phenylenecarbonylphenylene. The oligomers of this invention are readily soluble in conventional solvents, have relatively low melting points, may be prepared by batch process and are readily curable into useful high temperature resins.

Therefore, one purpose of this invention is to prepare high temperature resins.

Another purpose of this invention is to provide a thermally curable thermosetting ethynyl-substituted aromatic polymer having a flexible backbone structure.

A further purpose of this invention is to provide a method of introducing the triazine ring system into the backbone of a curable oligomer to thereby enhance the solubility of the oligomer.

A still further purpose of this invention is to provide a source of mono-, di-, and trisubstituted ethynylated triazine compounds which can be prepared simultaneously by batch process, separated, and subsequently cured to polymers with varying properties by changes in the compositions of compounds being cured.

That the above stated purposes and other advantages have been accomplished will be evident upon reference to the following Detailed Description of the Invention.

DETAILED DESCRIPTION OF THE INVENTION

It has been discovered that ethynyl-substituted compounds having symmetrical triazine (s-triazine) rings within the backbone of their molecular structures yield thermally stable thermoset polymers when cured. These compounds which are also referred to herein as oligomers and/or prepolymers are easily prepared from readily available starting materials, they are soluble in conventional low boiling solvents, they require lower processing temperatures to effect thermal cures, and when cured, they yield flexible resins that are oxidatively stable.

Oligomers prepared in accordance with this invention may be described as having three generalized structures. The first structure contains only one s-triazine ring joined to two phenylene rings having acetylene terminal groups thereon by a single bond a divalent group or by a heteroatom as shown below

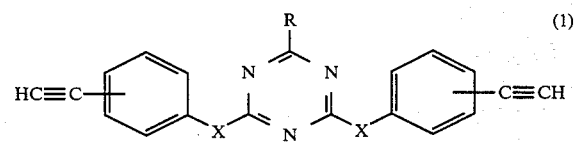

(1)

where X, hereinafter referred to as a linkage, is a single bond phenylene, diphenylene, O, S, or NR', $(CH_2)_n$, $C(C_nH_{2n+1})_2$, or $[C(Ar_2)]_n$, where Ar is aryl, and where R is alkyl or aryl and R' is H, alkyl or aryl and n ranges from 1 to about 4.

The second species of this invention is substantially identical to that of Equation (1). However, R may be alkoxy or aryloxy.

The third species of this invention is an extended molecule having two s-triazine rings within the backbone structure and ethynylphenyl terminal groups as shown below

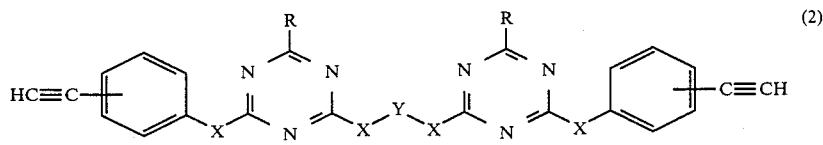

where X is a single bond, a heteroatom, or a divalent moiety as defined above, R is as defined above and Y is a divalent moiety whose structure is

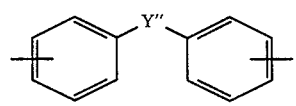

where Y' may be $C(CF_nH_{3-n})_2$ where n ranges from 0 to 3, CO, $SO_2$, S, or O.

Compounds of structure (1) where R is alkyl or aryl are prepared in two general steps. In the first step, one mole of cyanuric chloride is reacted with an alkyl or aryl Grignard reagent to displace one of the chlorine substituents and give the mono-substituted dichloro-s-triazine derivative. The resulting product is reacted with Step II with two moles of a functionally substituted ethynylaryl derivative such as ethynylphenoxy, undergoing a displacement reaction to give the corresponding prepolymer. These steps are schematically depicted below:

Step I

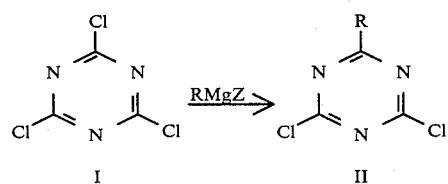

Step II

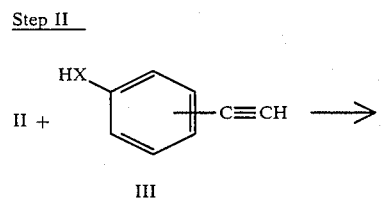

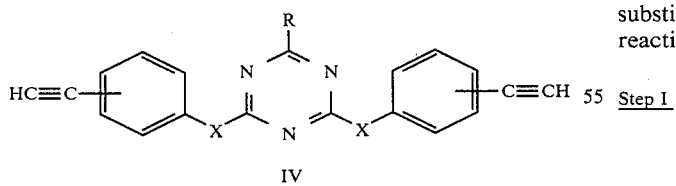

The terms alkyl or aryl Grignard reagents are known by those skilled in the art to refer to compounds whose structures are RMgZ where R may be an alkyl group and Z is a halide to yield a compound such as isopropylmagnesium bromide, methylmagnesium chloride or methylmagnesium iodide. R also may be an aryl or substituted aryl group and thus yield arylmagnesium halides such as phenylmagnesium bromide, or methoxyphenylmagnesium bromide.

Functionally substituted ethynylaryl compounds (III) found to be useful in this invention include, but are not limited to, compounds whose structures are:

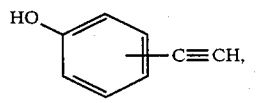

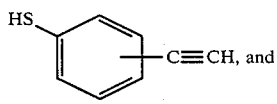

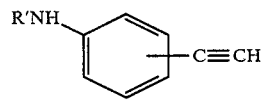

where R' is H, alkyl or aryl. There are a number of possible substituted ethynylated arylenes that can be employed to displace the remaining chlorine atoms on the s-triazine ring. The key is to select a functional substituent such that a stable linkage is provided between the ethynylated aryl ring and the s-triazine ring. For this purpose, ether and thioether linkages are preferred because of their relative high stability and backbone flexibility.

When R in structure (1) is alkoxy or aryloxy, the procedure for preparing the compounds varies somewhat in that aliphatic or aromatic alcohols are utilized in Step I, in lieu of the alkyl or aryl Grignard reagents, to displace one of the chlorine atoms of the starting material with an alkoxy or aryloxy substituent.

To prepare compounds of Structure (1) wherein X is a single bond or a divalent moiety, the product of the first chlorine displacement reaction of Step I is then treated in Step II with a blocked-ethynyl substituted Grignard reagent to form an end protected ethynylphenyl triazine derivative. The end protecting group is subsequently removed in Step III by a deblocking reaction employing a weak base to yield the desired acetylene terminated s-triazine having an alkoxy or aryloxy substituent. This procedure is depicted in the following reaction sequence:

Step I

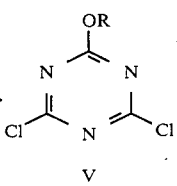

Step II

 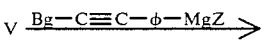

-continued

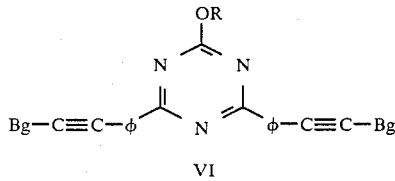

VI

Step III

VI —Weak Base→

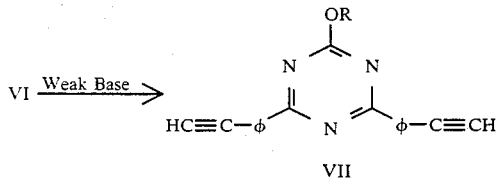

VII where φ can be a substituted aryl moiety whose structure is:

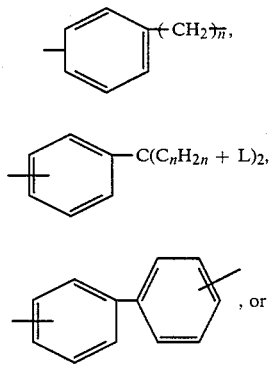

-continued

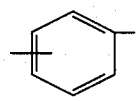

and Bg is a blocking, or end protecting, group such as a trimethylsilyl. The blocking and deblocking sequences (Steps II and III) are required to maintain the integrity of the ethynyl group in the presence of the Grignard reagent.

Ethynylated aryl Grignard reagents containing end protective, or blocking groups may be easily synthesized via well-known nucleophilic addition or substitution methods of preparing Grignard reagents. A typical example of such a compound is:

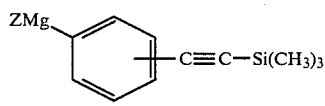

Extended ethynylphenyl terminated s-triazine oligomers having structure (2) as shown above are prepared by a sequence of similar steps and identical or similar starting materials used to prepare the oligomers of structure (1). As shown in the following reaction sequence, cyanuric chloride (Compound I) is treated with a phenylmagnesium halide to form 6-phenyl-2,4-dichloro s-triazine (Compound II). The synthesis process then varies from that used to produce compounds of structure (1) in that this material is then reacted with a stoichiometric amount of a functionally substituted phenylacetylene (Compound VIII) to produce a substituted phenylchloro-s-triazine derivative (Compound IX) where linkage X may be O, S, or NH. Two moles of Compound IX are then reacted with one mole of a difunctional aromatic (Compound X) to yield the desired oligomer (Compound XI).

Step I

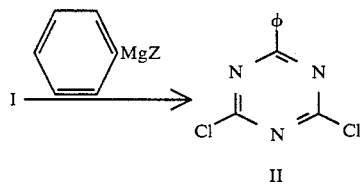

Step II

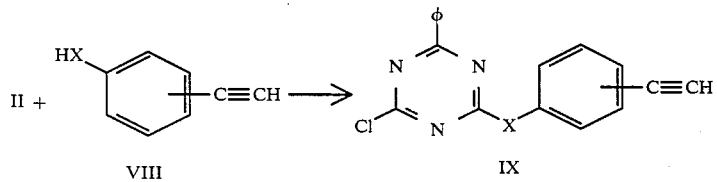

Step III

2(IX) + 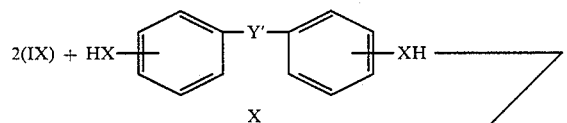

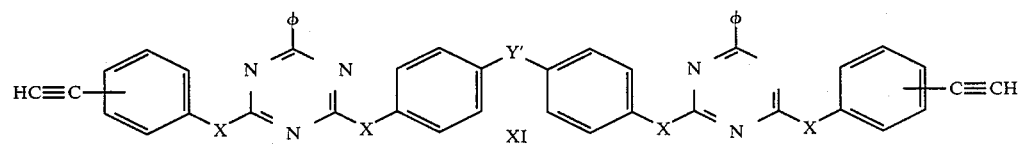

An alternate synthetic route to prepare extended ethynylphenyl terminated s-triazines is shown below where the compounds are numbered as above.

Step I

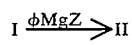

Step II

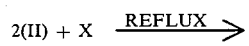

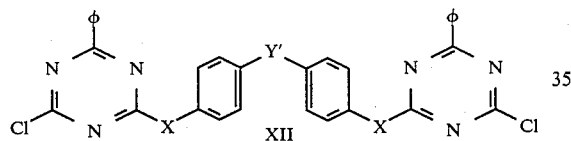

Step III

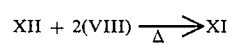

This latter route appears to be preferred in that it produces the largest yield.

There are a wide variety of difunctional aromatics that are suitable for inclusion in the synthesis process of this invention. Typical examples are compounds of the general formula,

 (4)

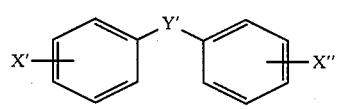

where X' and X" may be O, S, or NH and Y' is as defined for Structure (3) above, such as:

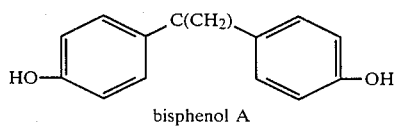
bisphenol A

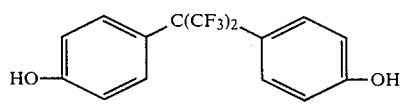

-continued
bisphenol AF

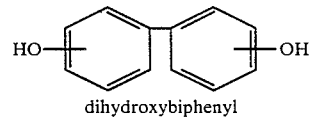
dihydroxybiphenyl

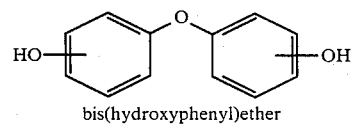
bis(hydroxyphenyl)ether

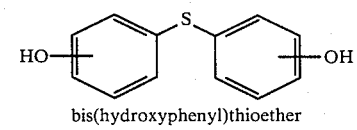
bis(hydroxyphenyl)thioether

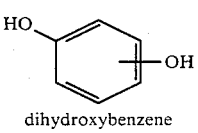
dihydroxybenzene

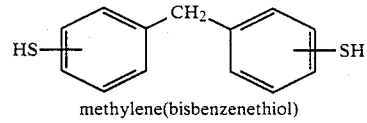
methylene(bisbenzenethiol)

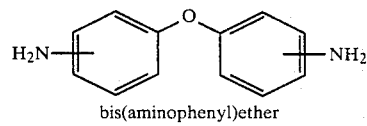
bis(aminophenyl)ether

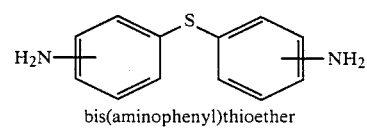
bis(aminophenyl)thioether

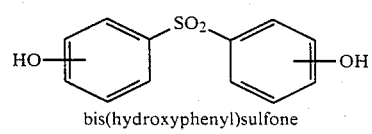
bis(hydroxyphenyl)sulfone or a compound of Structure (4) where X' and X" are selected from the group of divalent heteroatoms consisting of O, S, and NH, where X' is not equal to X".

Specific examples illustrating the preparation of compounds in accordance with this invention are shown below.

EXAMPLE I

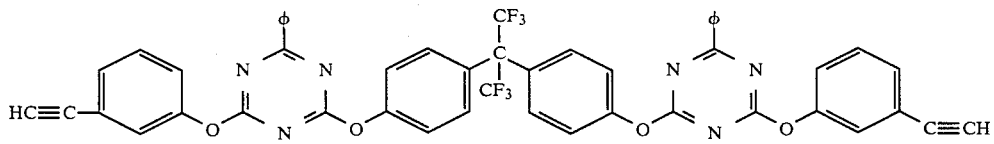

Single Triazine Ring Joined to Phenylacetylene Terminal Groups by Ether Linkages One mole of cyanuric chloride was treated with one mole of phenylmagnesium bromide in Step I to form 6-phenyl-2,4-dichloro-s-triazine. This reaction is described in detail in a paper by Hirt, et al., *Helvetica Chimica Acta* 33, pages 1365-9 (1950). In Step II, the product of the reaction of Step I (0.025 mole) was dissolved in chloroform (35 ml) and stirred in an oil bath at 50° C. To this solution was added dropwise with stirring a solution of sodium hydroxide (0.05 mole), 3-ethynylphenol (0.05 mole), and water (25 ml) during one hour. The reaction was continued overnight and yielded an organic phase which was subsequently separated and dried over sodium sulfate. Removal of solvent under reduced pressure gave a solid product 6-phenyl-2,4-bis(3-ethynylphenoxy)-s-triazine, mp 139°–144° C., which thermally cured at 260° C. to a heat stable polymer.

EXAMPLE II

Single Triazine Ring Joined to Phenylacetylenes by Single Bond

One mole of cyanuric chloride was treated with one mole of phenylmagnesium bromide as described in Step I of Example I. The product of this reaction (2.3 g, 0.01 mole) in 25 ml of tetrahydrofuran (THF) was added slowly to a refluxing solution of the Grignard reagent prepared from 1-(trimethylsilyl)-2-(4-bromophenyl)acetylene (0.03 moles) and magnesium (0.75 g). The solution was stirred overnight, filtered, and the solvent removed. To the residue which remained was added a solution of KOH (10.0 g) in water (5 ml), anhydrous ethanol (100 ml) and dioxane (100 ml). The resulting mixture was heated for 2.5 hours at 60° C., filtered, and the solvent removed. Chromatographic separation of the resulting residue yielded a yellow solid, 6-phenyl-2,4-bis(4-ethynylphenyl)-s-triazine, which melted at approximately 215° C. with rapid polymerization.

EXAMPLE III

Extended Chain s-Triazine Having Ether Linkages 6-phenyl-2,4-dichloro-s-triazine was prepared from cyanuric chloride as described above. This material (35.0 g, 0.155 mole) was then added with stirring, under argon, to a solution of bisphenol AF (26.0 g, 0.0775 mole) in acetone (400 ml) containing $K_2CO_3$ (30.0 g). The resulting reaction mixture was stirred overnight at 50° C., refluxed for six hours, filtered and the solvent evaporated. The resulting residue was recrystallized from hot heptane to give 47.0 g (86% yield) of a white compound which melted at 117°–125° C. This product (5.0 g, 0.007 mole) along with a trace of 18 Crown-6 catalyst (Aldrich Chemical Co., Milwaukee, Wisc.) was added to a solution of a salt formed from the reaction of 3-hydroxyphenylacetylene and KOH (0.017 mole) in THF (100 cc). The reaction mixture was refluxed for 80 hours and the solvent removed. The resulting residue was dissolved in methylene chloride and washed carefully with water. The organic layer whose structure is was evaporated to give a 74% yield of the product.

EXAMPLE IV

Single Triazine Ring Joined to Phenylacetylene Terminal Groups by Amino Groups

One mole of cyanuric chloride was treated with phenylmagnesium bromide as described in Step I of Example I. The resulting reaction product (10.0 g, 0.044 mole) in $CHCl_3$ (100 ml) was stirred in a 250 ml 3-neck round bottom flask while m-aminophenylacetylene (10.5 g, 0.09 mole) was added dropwise with cooling. To this mixture was added $K_2CO_3$ (12.4 g, 0.09 mole) and water (20 ml). The organic layer was separated, dried, and the solvent evaporated. The residue was triturated in benzene and dried to give 6-phenyl-2,4-bis(3-ethynylphenylamino)-s-triazine a compound that melted at 210° C. with polymerization. Thermo-gravimetric analysis showed that the polymer was stable to 425° C.

INDUSTRIAL APPLICATION

Oligomers prepared in accordance with this invention exhibit high temperature properties when polymerized and thus will be useful in the fabrication of high temperature composites and other structural materials. The relatively low melting point characteristics and high solubility in low boiling solvents facilitate their use in commercial applications because of their relative ease of processing. Further, their relatively low molecular weights enhance quality control in that the oligomers are highly reproducible in high purity.

What is claimed is:

1. An oligomer of the formula

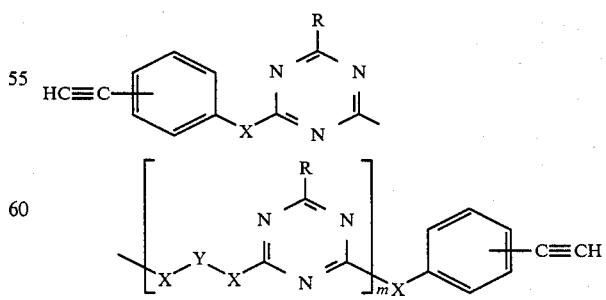

where m is zero or 1; R is lower alkyl, lower alkoxy, phenyl, or phenoxy; X is selected from the group consisting of a single bond; —O—; —S—; —N(—R')— where R' is H, lower alkyl, or phenyl; -phenylene-;

-biphenylene-; —(CH$_2$)$_n$— where n is an integer from 1 to about 4; —C(C$_n$H$_{2n+1}$)$_2$— where n is an integer from 1 to about 4; —C(Ar)$_2$—$_n$ where n is an integer from 1 to about 4 and Ar is phenyl; Y is

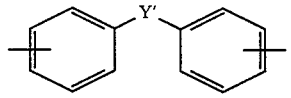

where Y' is selected from the group consisting of a single bond, —C(=O)—, —S(O$_2$)—, —S—, —O—, or —C(CF$_n$H$_{3-n}$)$_2$— where n ranges from 0 to 3.

2. The oligomer of claim 1 wherein m is zero, X is O, and R is phenyl.

3. The oligomer of claim 1 wherein m is zero, X is NR', R' is H, and R is phenyl.

4. The oligomer of claim 1 wherein m is zero, X is a single bond and R is phenyl.

5. The oligomer of claim 1 wherein the acetylene terminal groups are joined to the phenylene ring in a meta position with respect to the X linkage.

6. The oligomer of claim 1 wherein m is 1, X is O, R is phenyl and Y' is C(CF$_3$)$_2$.

7. A process for preparing an oligomer according to claim 1, comprising the steps of
treating cyanuric chloride with a Grignard reagent or an alcohol to displace a chlorine substituent and thereby forming a monosubstituted dichloro-s-triazine derivative; and
subsequently displacing the remaining two chlorine substituents by reacting said triazine derivative with functionally substituted ethynylphenyl derivatives.

8. The process of claim 7 wherein said dichloro-s-triazine derivative is reacted with a blocked-ethynyl substituted Grignard reagent and subsequently deblocked with a weak base to thereby yield an ethynylphenyl s-triazine derivative of the structure:

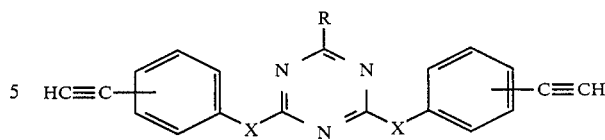

where X is a single bond or a divalent moiety selected from the group (CH$_2$)$_n$, C(C$_n$H$_{2n+1}$)$_2$ or C(Ar$_2$)$_n$, where Ar is phenyl and n is an integer ranging from 1 to about 4.

9. A process for forming an oligomer according to claim 1 comprising the steps of:
treating cyanuric chloride with a Grignard reagent to form a monosubstituted dichloro-s-triazine derivative;
reacting at least two moles of said triazine derivative with a difunctional aromatic compound whose structure is

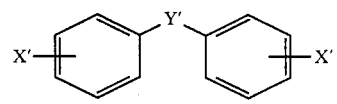

where X' is O, S, or NH and Y' is a divalent moiety selected from the group consisting of O, S, CO, SO$_2$ or C(CF$_n$H$_{3-n}$)$_2$, where n ranges from 0 to 3 to form a triazine rings terminated oligomer; and
subsequently capping said oligomer by reacting it with two moles of a functionally substituted ethynylated arylene whose structure is

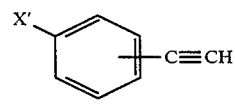

where X' is as defined above.

* * * * *